United States Patent [19]

Shibata

[11] Patent Number: 4,700,247

[45] Date of Patent: Oct. 13, 1987

[54] LOADING/EJECTING APPARATUS FOR FLOPPY DISC

[75] Inventor: Haruo Shibata, Tokyo, Japan

[73] Assignee: Kabushiki Kaisha Toshiba, Kawasaki, Japan

[21] Appl. No.: 688,986

[22] Filed: Jan. 4, 1985

[30] Foreign Application Priority Data

Jan. 10, 1984 [JP] Japan .................................. 59-2200

[51] Int. Cl.$^4$ ........................................... G11B 17/04
[52] U.S. Cl. .................................................... 360/99
[58] Field of Search .................................. 360/97, 99

[56] References Cited

U.S. PATENT DOCUMENTS

| | | | |
|---|---|---|---|
| 3,770,908 | 11/1973 | Craggs | 360/97 |
| 3,845,502 | 10/1974 | Paus | 360/97 |
| 3,899,794 | 8/1975 | Brown, Jr. | 360/133 |
| 3,972,072 | 7/1976 | Richt | 360/93 |
| 4,024,581 | 5/1977 | Lesca et al. | 360/97 |
| 4,065,800 | 12/1977 | Wilson et al. | 360/137 |
| 4,208,681 | 6/1980 | Hatchett | 360/97 |
| 4,227,224 | 10/1980 | Umezawa et al. | 360/96.5 |
| 4,272,794 | 6/1981 | Sharky | 360/97 |
| 4,310,864 | 1/1982 | Patel et al. | 360/97 |
| 4,368,495 | 1/1983 | Hamanaka et al. | 360/97 |
| 4,447,838 | 5/1984 | Kato | 360/96.5 |
| 4,479,210 | 1/1984 | Nakayama | 369/194 |
| 4,539,613 | 9/1985 | Suyama et al. | 360/97 |
| 4,562,498 | 12/1985 | Shibata | 360/97 |
| 4,587,585 | 5/1986 | Shimaoka et al. | 360/97 |

Primary Examiner—Robert S. Tupper
Attorney, Agent, or Firm—Cushman, Darby & Cushman

[57] ABSTRACT

A floppy disc apparatus according to the invention comprises a receiver in which a floppy disc is inserted, a guide plate for guiding the receiver along a vertical direction, an eject member, which has oblique holes engaging with the receiver, for locating the receiver at an upper position thereof when the eject member is latched at a front end position thereof in an unloaded state, for moving the receiver so as to locate it at a lower position thereof, i.e., an operation position when a floppy disc is inserted to a predetermined position and the eject member is unlatched, and for moving the floppy disc to an upper position thereof when the eject member is located at the front end position thereof and is pushed backward, and a pop-up mechanism for pushing forward the floppy disc which is located at the upper position.

1 Claim, 12 Drawing Figures

F I G. 4A
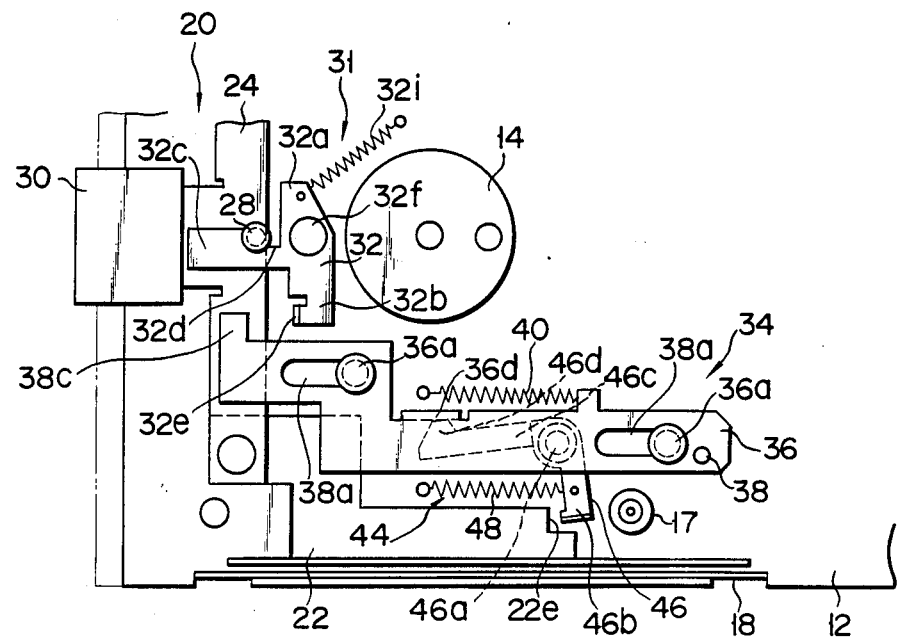
F I G. 4B
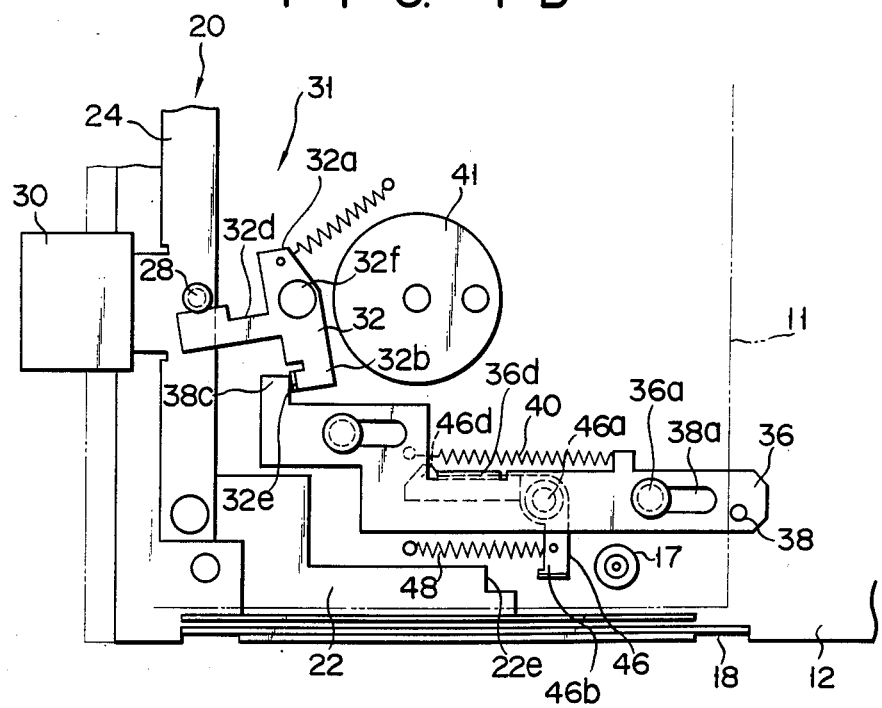

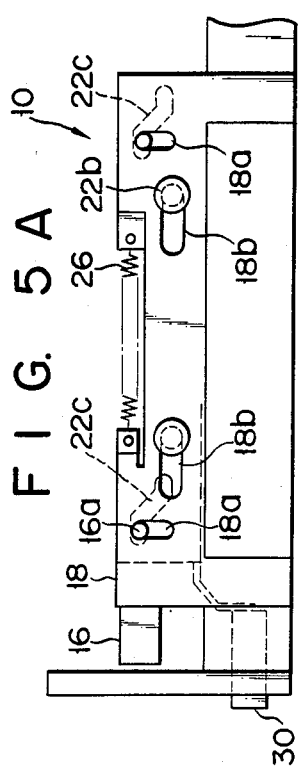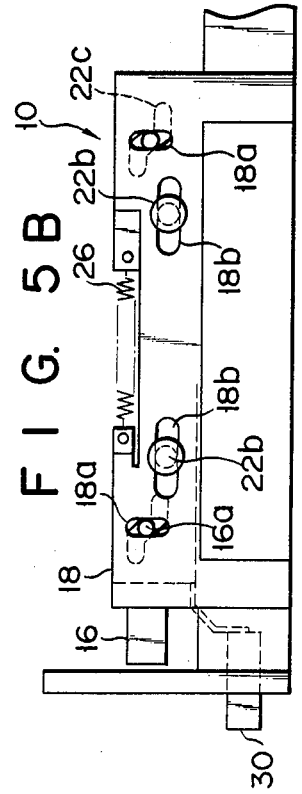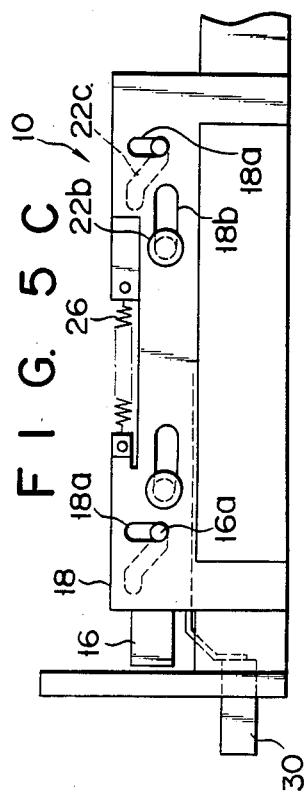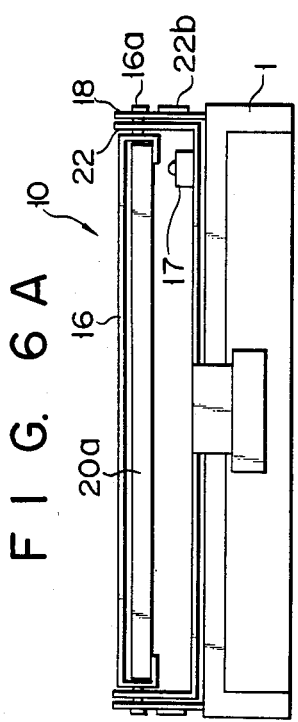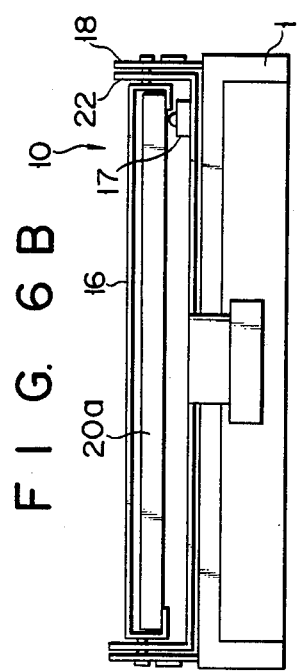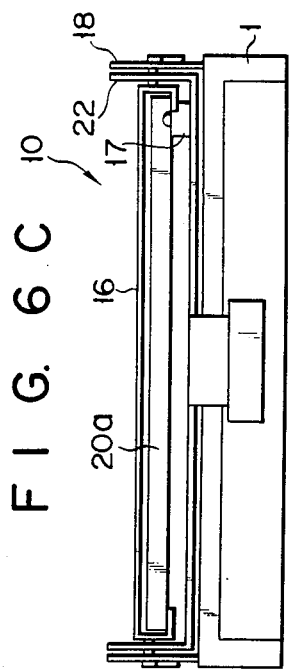

LOADING/EJECTING APPARATUS FOR FLOPPY DISC

BACKGROUND OF THE INVENTION

The present invention relates to a floppy disc apparatus which utilizes a medium stored in a hard case.

Floppy disc apparatuses for utilizing floppy discs in which a flexible magnetic recording medium is stored in a hard case made of, e.g., a plastic material, have been recently used. The magnetic recording medium is normally disc-shaped having a diameter of about 3.5 inches. In such floppy disc apparatuses, the floppy disc loaded in a wordprocessor or small computer is, relatively, frequently loaded and ejected. For this reason, the loading and ejecting operation of the floppy disc must preferably be easy to perform. However, in conventional floppy disc apparatuses, the loading and ejecting operation of the floppy disc is relatively cumbersome. Although various attempts for improvement have been made, it is difficult to realize a floppy disc apparatus which is easily and reliably operated.

SUMMARY OF THE INVENTION

It is an object of the present invention to provide a floppy disc apparatus in which a loading and ejecting operation of a floppy disc can be easily and reliably performed.

In order to achieve the above object, there is provided a floppy disc apparatus comprising:

a receiver which has a coupling pin extending toward a left-and-right direction of said floppy disc apparatus from a side surface extending along a back-and-forth direction thereof, and into which a floppy disc is inserted from a front side thereof;

a guide plate provided with an elongate hole extending along the back-and-forth direction of said floppy disc apparatus and another elongate hole extending along a vertical direction thereof;

an eject member, which has another coupling pin mounted on a side surface thereof and an oblique hole, which is inclined toward a down-and-back direction, for loosely receiving said coupling pin extending from said receiver through said elongate hole of said guide plate, for locating said receiver at a lower position, i.e., an operation position in a state wherein said eject member is normally biased forward and moves to a front end position thereof, and for locating said receiver at an upper position when said eject member is pushed backward and reaches a rear end position;

a pop-up mechanism which is biased forward and is moved backward by being pushed by said floppy disc inserted in said receiver;

a second latch member for holding said eject member in position when said eject member is located at the rear end position, and for releasing a holding state of said eject member so as to move said eject member forward when said pop-up mechanism is pushed upon insertion of said floppy disc; and a first latch mechanism for engaging with said pop-up mechanism so as to prevent a forward movement thereof when said eject member is biased and located at the front end position, and for releasing an engagement state of said pop-up mechanism so as to enable the forward movement of said pop-up mechanism when said eject member is pushed backward.

According to the floppy disc apparatus of the present invention with the above arrangement, a floppy disc can be loaded into the floppy disc apparatus by simply inserting it in the apparatus. On the other hand, the loaded floppy disc can be ejected from the floppy disc apparatus by simply depressing an eject button. Therefore, the loading and ejecting operations are markedly easy in practical use.

BRIEF DESCRIPTION OF THE DRAWINGS

FIGS. 4A to 4C are respectively partial plan views for explaining a three-step operation when a floppy disc is loaded or unloaded in/from the apparatus of the present invention;

FIGS. 5A to 5C are respectively front views for explaining the above three-step operation; and FIGS. 6A to 6C are respectively side views corresponding to FIGS. 5A to 5C.

DETAILED DESCRIPTION OF THE PREFERRED EMBODIMENT

Figure 1:
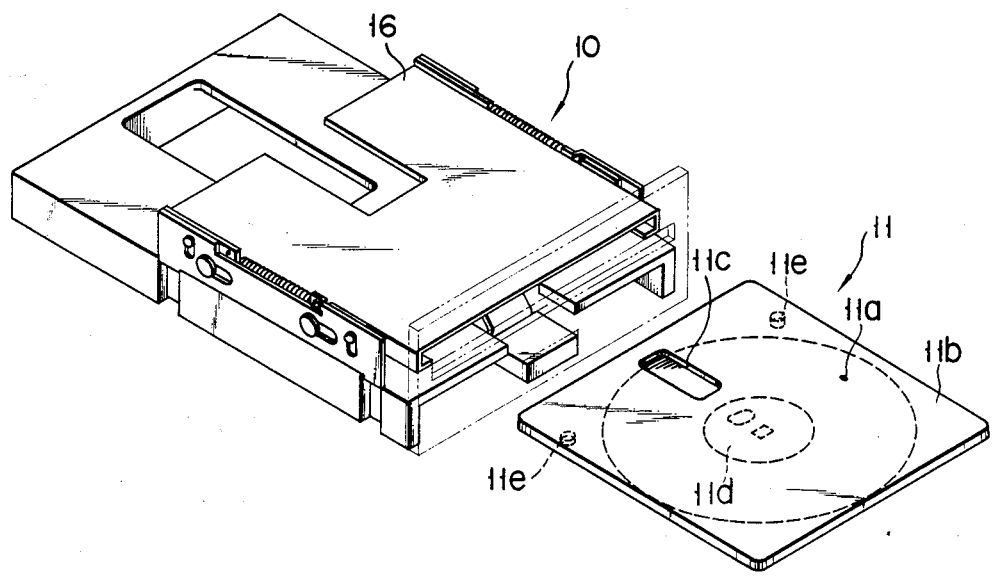
FIG. 1 is a perspective view of the overall floppy disc apparatus according to the present invention.

An embodiment of the present invention will now be described. In this embodiment, a state where a floppy disc is horizontally loaded in a floppy disc apparatus will be described. This is to simplify a description for relative positions of components and operations of the apparatus. A floppy disc 11 which is horizontally loaded in a floppy disc apparatus 10 shown in FIG. 1 comprises an annular medium 11a and a disc-shaped hub 11d which is formed integrally with the medium 11a and made of a plastic or metal. The medium 11a and the hub 11d are stored in a hard case 11b made of plastic. A window 11c is formed in the upper surface of the hard case 11b. The floppy disc 11 is loaded or ejected in/from a receiver 16 of the floppy disc apparatus 10. When the floppy disc 11 is horizontally located at a predetermined position, a magnetic head (not shown) provided in apparatus 10 is brought into contact with the medium 11a through the window 11c. Thus, the magnetic head reads and/or writes data. In this case, the floppy disc 11 is fitted around a spindle 14 (FIGS. 2 and 3) which is driven by an electric motor (not shown) so as to be rotated. Position-aligning holes 11e are formed in the hard case 11b. Position-aligning pins 17 extending upward from a frame 12 are respectively inserted in the holes 11e. The floppy disc 11 is aligned in this manner and engaged with the spindle 14.

Figure 2:
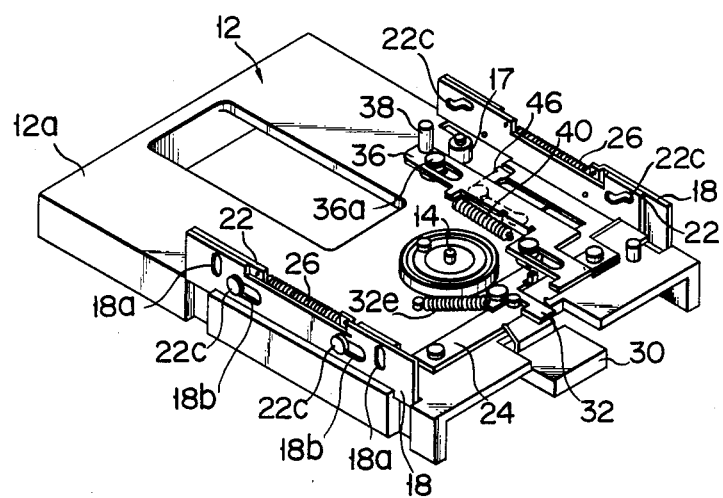
FIG. 2 is a perspective view partially showing the floppy disc apparatus except for a receiver.
Figure 3:
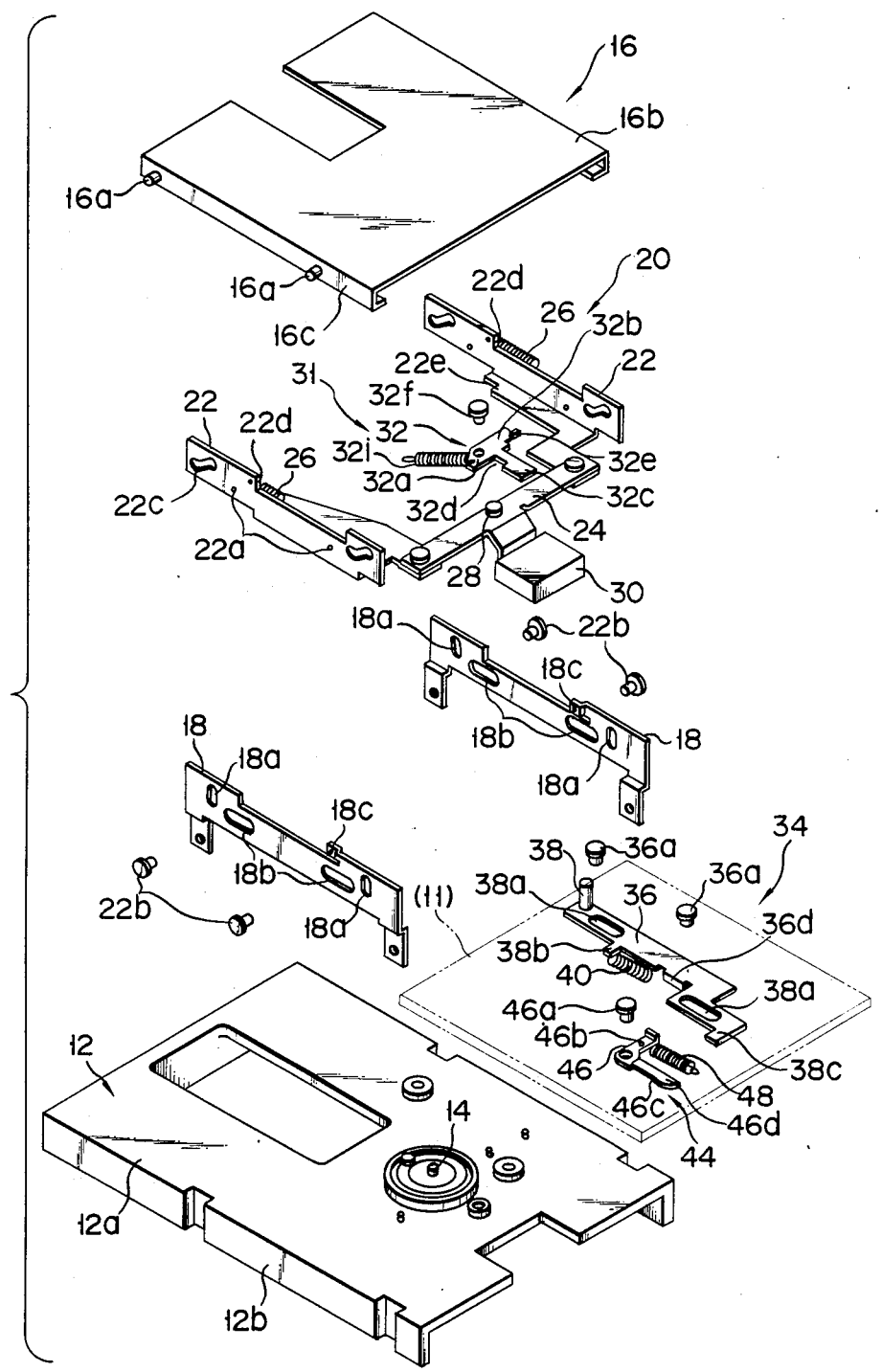
FIG. 3 is an exploded perspective view of the apparatus shown in FIG. 1.

An arrangement of the floppy disc apparatus 10 referring to the present invention will be briefly described mainly with reference to FIGS. 1 to 3. Thereafter, the arrangement and operation of the apparatus 10 will be described in more detail. The floppy disc apparatus 10 according to the present invention comprises the frame 12 having a rectangular flat portion 12a which is horizontally arranged, and walls 12b which are arranged at two sides along a longitudinal direction, i.e, a back-and-forth direction of the flat portion 12a. The floppy disc apparatus further comprises guide plates 18 which extend upward to be perpendicular to the flat portion 12a and extend along the two walls 12b; an eject member 20 which is engaged with the guide plates 18 and moved along the longitudinal direction of the frame 12; a receiver 16 which is engaged with the guide plates 18 and the eject member 20 so as to be movable back and forth as well as up and down with respect to the frame 12 along the guide plates 18; a first latch mechanism 44 for latching the eject member 20 at a predetermined position; a pop-up mechanism 34 for releasing the latched state of the first latch mechanism 44 and externally feeding the loaded floppy disc 11; and a second latch mechanism 31 for latching the pop-up mechanism, and for releasing the latched state thereof utilizing the eject member 20. FIG. 2 shows the floppy disc apparatus 10 in the state where the receiver 16 and the eject mechanism 20 are removed, and FIG. 3 shows an exploded perspective view of the apparatus 10 shown in FIG. 1.

The spindle 14 which is driven by an electric motor (not shown) provided under the frame 12 (FIG. 3) extends upward from the frame 12. The floppy disc 11 (FIG. 1) fitted around the spindle 14 is rotated together therewith. Each of the guide plates 18 of the frame 12 is provided with two elongate holes 18a extending perpendicular to the flat portion 12a and two elongate holes 18b extending parallel to the portion 12a. In addition, a coupling portion 18c for coupling one end of each spring 26, to be described later, is provided on an upper portion of the corresponding guide plate 18.

The eject member 20 is arranged at a position immediately inside the two guide plates 18 so as to be parallel thereto, and comprises two eject plates 22 extending along the back-and-forth direction, a joint plate 24 extending perpendicular to the plates 22 so as to join them, an eject button 30 extending forward from a central portion of the joint plate 24, and a latch pin 28 provided at the central portion of the joint plate 24. In each of the eject plates 22, two pin holes 22a are formed, and two coupling pins 22b are fixed in the pin holes 22a through the corresponding elongate holes 18b.

Positions of the pin holes 22a and the elongate holes 18b are determined so that the eject member 20 moves back and forth to be parallel to the flat portion 12a of the frame 12 when a force is applied upon the eject member 20 toward a back-and-forth direction.

Two oblique holes 22c which are inclined downward toward the rear end of the plate 22 are provided in each of the eject plates 22.

The receiver 16 in which the floppy disc 11 is horizontally inserted from the front side of the apparatus 10 comprises a rectangular flat portion 16b, two walls 16c having an L-shaped cross section, and two coupling pins 16a extending horizontally outward from each of the walls 16c. The flat portion 16b is arranged parallel to the flat portion 12a of the frame 12, and the walls 16c are arranged immediately inside the respective eject plates 22 so as to be parallel thereto. The coupling pins 16a are inserted in the corresponding elongate holes 18b of each of the guide plates 18 through the corresponding oblique holes 22c of each of the eject plates 22. Therefore, when the eject member 20 moves backward in the state wherein the frame 12, the eject member 20 and the receiver 16 are joined, the pins 16a are pushed upward along the corresponding oblique holes 22c, and move upward along the corresponding elongate holes 18a of the guide plates 18. As a result, the receiver 16 moves upward with respect to the frame 12. Conversely, when the eject member 20 moves forward, the receiver 16 moves downward. Note that the other end of each of the springs 26, one end of which is fixed to the coupling portion 18c of the guide plate 18, is fixed to a coupling portion 22d of an upper edge portion of the eject plates 22. Thus the springs 26 always bias the eject member 20 forward.

The pop-up mechanism 34 includes a pop-up plate 36 extending parallel to the flat portion 12a of the frame 12 along a back-and-forth direction, a pop-up pin 38 extending vertically upward from the pop-up plate 36, a pop-up spring 40 for biasing the pop-up plate 36 forward, and guide pins 36a. Two elongate holes 38a are formed in the pop-up plate 36 to extend along the longitudinal direction thereof. Since the guide pins 36a are fixed to the flat portion 12a through the corresponding elongate holes 38a of the pop-up plate 36, the pop-up plate 36 is movable along the longitudinal direction of the flat portion 12a. The pop-up plate 36 has a wall 36d bent downward near the central portion thereof, and a projection 38c extending toward the left side of FIG. 3. One end of the pop-up spring 40 is fixed to the flat portion 12a of the frame 12, and the other end thereof is fixed to a projection 38b of the pop-up plate 36. When the floppy disc 11 indicated by the alternate long and two dashed line of FIG. 3 is loaded in the apparatus 10 and the pop-up pin 38 is pushed by a distal end of the floppy disc 11, the pop-up plate 36 moves backward against the biasing force of the pop-up spring 40 while being guided along the elongate holes 38a.

The first latch mechanism 44 comprises a rotating plate 46 rotatable about a pop-up pin 46a which is fixed to the flat portion 12a of the frame 12. The rotating plate 46 has a biasing arm 46b extending transversely to the right, and an engaging arm 46c extending to the front along the longitudinal direction thereof. The rotating plate 46 is biased clockwise by a pop-up spring 48, one end of which is fixed to the biasing arm 46b and the other end of which is fixed to the flat portion 12a of the frame 12.

The second latch 31 consists of a latch plate 32 which is rotatable about a latch pin 32f fixed to the flat portion 12a of the frame 12, and a latch spring 32i. The latch plate 32 has a driven arm 32b extending toward the right side of FIG. 3 and having an engaging portion 32e at the distal end thereof, a biasing arm 32a which extends in a direction opposite to the driven arm 32b and to which one end of the latch spring 32i for biasing the latch plate 32 clockwise is fixed, and an engaging arm 32c extending forward and having a notch 32d at a left end portion thereof.

The relationship of respective positions of the second latch mechanism 31, the pop-up mechanism 34, the first latch mechanism 44, the eject plate 22 and the joint plate 24 is apparent from FIGS. 2 and 4A.

Figure 4C:
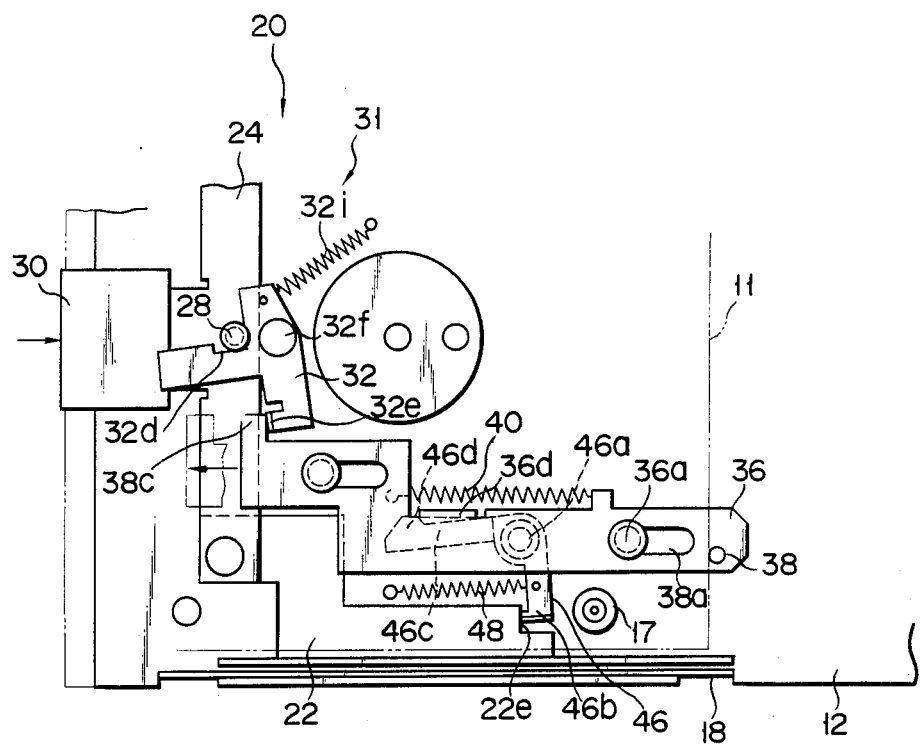

An operation of the floppy disc apparatus according to the present invention will now be described. In order to eject the floppy disc 11 from the apparatus 10 of FIG. 1, an eject button 30 is depressed backward. In order to begin a description from loading the floppy disc 11 in the apparatus 10, a state after ejecting the floppy disc 11 by depressing the eject button 30 will be described with reference FIGS. 3 and 4A. FIGS. 4A to 4C show the plan views of the front right side portions of the apparatus shown in FIG. 2. These figures are drawn assuming that the left side of the apparatus 10 is the front side.

FIG. 4A shows the state after ejecting the floppy disc 11 from the apparatus 10, that is, the floppy disc unloaded state. In this state, the pop-up mechanism 34 is located at its frontmost position by the biasing force of the pop-up spring 40. At this position, the guide pins 36a are respectively urged against the rear end of the corresponding elongate holes 38a formed in the pop-up plate 36. The rotating plate 46 of the first latch mechanism 44 is pressed against the wall 36d by the biasing force of the pop-up spring 48 since the projection 46d at the distal end of the engaging arm 46c is not engaged with a front edge of the wall 36d of the pop-up plate 36. The eject member 20 which is reciprocal along the back-and-forth direction is located at a rear end position thereof. The eject member 20 is kept at the rear end position in such a manner that the latch pin 28 fixed to the joint plate 24 of the eject member 20 is engaged with the notch 32d of the engaging arm 32c of the second latch mechanism 31 biased by the latch spring 32i. The springs 26 provided between the eject plate 22 and the guide plates 18, and the latch spring 32i provided between the frame 12 and the driven arm 32b of the second latch mechanism 31 are kept stretched. This state of the receiver 16 is shown in FIGS. 5A and 6A. FIG. 5A is a side view of the apparatus 10 which is horizontally placed so that the front end thereof is directed to the left, and FIG. 6A is a front view thereof. As described above, the eject member 20 is located at the rear end position thereof. Therefore, the oblique holes 22c of the eject member 20 are located at a rightmost position with respect to the corresponding elongate holes 18a which are formed along the vertical direction of the guide plates 18. Thus, the coupling pins 16a of the receiver 16, and therefore, the receiver 16 is located in the uppermost position thereof. FIG. 6A shows the state wherein the floppy disc 11 is positioned at an uppermost position thereof.

The state after the floppy disc is unloaded is as described above. An operation for loading the floppy disc in the apparatus in the above state will be described hereinafter. When the floppy disc 11 is inserted in the receiver 16 from the right side of FIG. 1, that is, in an insertion port of the front side, the distal end of the floppy disc 11 abuts against the pop-up pin 38 and pushes the pop-up plate 36 backward (with reference to FIG. 4B hereinafter). When the pop-up plate 36 moves to a position near the moving end thereof, it abuts against the projection 38c and an engaging portion 32e of the engaging arm 32b of the latch plate 32 of the second latch mechanism 31, thus rotating the latch plate 32 counterclockwise in FIG. 4B of the latch pin 32f. By rotation of the latch plate 32, the latch pin 28 provided to the joint plate 24 of the eject member 20 is released from engagement with the notch 32d of the latch plate 32. The eject member 20 then moves forward by the biasing force of the springs 26 (FIGS. 2 and 3), as shown in FIG. 4B. Therefore, the oblique holes 22c of the eject plates 22 move forward with respect to the corresponding elongate holes 18a of the guide plates 18, and respective crossing portions of the both holes are gradually lowered. As a result, the receiver 16 also gradually moves downward. This state is illustrated in FIGS. 5B and 6B. In FIG. 5B, each of the coupling pins 22b is located at the intermediate position of the elongate hole 18b, and each of the coupling pins 16a is also located at the intermediate position of the oblique hole 22c. The receiver 16 is located at a position slightly lowered from the position shown in FIG. 5A and FIG. 6A, as shown in FIGS. 5B and 6B.

In this manner, when the floppy disc 11 is further inserted to a predetermined position, the apparatus 10 is in the state shown in FIGS. 4B, 5C and 6C. The eject member 20 is located at its frontmost position determined by the relationship between the coupling pins 22b and the corresponding elongate holes 18b. The coupling pins 16a are located at the lowest position determined by the oblique holes 22c and the elongate holes 18a. Therefore, the receiver 16 is located at the lowest position, i.e., in an operation position, and the floppy disc 11 is fitted around the spindle 14 so as to be driven. Since the position aligning holes 11e of the floppy disc 11 are fitted into the corresponding position aligning pins 17 extending vertically upward from the flat portion 12a of the frame 12, the floppy disc 11 is satisfactorily fitted around the spindle 14. When the floppy disc 11 is pushed into the receiver 16 and the pop-up plate 36 moves backward as described above, the projection 46d of the engaging arm 46c of the rotating plate 46, which is pressed against the surface of the wall 36d of the plate 36, relatively moves forward along the surface of the wall 36d. Thus, the projection 46d is engaged with the front edge of the wall 36d by the biasing force of the pop-up spring 48. Therefore, the pop-up mechanism 34 does not move forward by the biasing force of the spring 48 which is applied between the frame 12 and the pop-up plate 36. The eject member 20 is located at its frontmost position by the biasing force of the springs 26, as described above.

An operation for ejecting the floppy disc 11 from the floppy disc loaded state shown in FIGS. 4B, 5C and 6C will be described hereinafter. In order to eject the floppy disc 11, an operator simply depresses the eject button 30 which is provided at the front portion of the apparatus 10. As is apparent from FIG. 3, when the eject button 30 is depressed, the eject member 20, therefore, the oblique holes 22c of the eject plates 22 move backward with respect to the corresponding elongate holes 18a of the guide plates 18. For this reason, the coupling pins 16a move upward along the corresponding elongate holes 18a, thus moving the receiver 16 upward. When the eject button 30 is further depressed, the latch pin 28 provided on the joint plate 24 moves backward and is engaged with the notch 32d of the latch plate 32 of the second latch mechanism 31. Therefore, rotation of the latch plate 32 and forward movement of the eject member 20 are prevented. Furthermore, when the eject button 30 is depressed, since the width of the notch 32d is larger than the diameter of the latch pin 28, the eject member 20 moves slightly backward. A stepped portion 22e of the eject plate 22 then pushes the biasing arm 46b of the rotating plate 46 toward a right side of FIG. 4B. Therefore, as shown in FIG. 4C, the rotating plate 46 rotates counterclockwise, and the engagement between the projection 46d of the engaging arm 46c of the rotating plate 46 and the wall 36d of the pop-up plate 36 is released. The pop-up plate 36 is moved forward toward the left side of FIG. 4C by the biasing force of the pop-up spring 40. The pop-up pin 38 pushes the rear end of the floppy disc 11 loaded in the apparatus 10 so that the distal end of the floppy disc 11 projects from the apparatus 10. The latch plate 32 of the second latch mechanism 31 is rotated by the forward movement of the pop-up plate 36. The latch plate 32 and the apparatus 10 are then in the state of FIGS. 4A, 5A and 6A, as described above.

As described above, according to the floppy disc apparatus of the present invention, when the floppy disc is loaded, the operator simply inserts the floppy disc therein. Then, the pop-up plate is operated and the receiver 16 in which the floppy disc is loaded moves in response thereto. The floppy disc is thus fitted around the spindle 14 and driven. In addition, since the pop-up plate is latched, the floppy disc is kept loaded until the operation for releasing the latch mechanism is performed. Meanwhile, when the floppy disc is to be unloaded from the above state, the operator simply depresses the eject button. The eject member moves in response to the eject button depression, and the floppy disc is released from the spindle in accordance with the movement of the eject member, thus being ejected. When the eject button and the eject member are latched at the pushed positions, they do not move downward toward the spindle except for loading the floppy disc.

What is claimed is:

1. A loading/ejecting apparatus for loading and ejecting a floppy disc into and from a magnetic disc drive apparatus which includes a frame having a flat portion and driving means thereon for rotating the floppy disc, comprising:

guide means attached to said frame for providing a guide on said frame;

a receiver located above said driving means and adapted to hold the floppy disc parallel to said flat portion of said frame, said receiver being supported by said guide means so as to be linearly movable, in a direction orthogonal to said flat portion between a first position whereat said floppy disc can be inserted into or ejected from said receiver, and a second position whereat said floppy disc can be driven by said driving means;

ejecting means for moving said receiver means between said first and second positions, said ejection means also being supported by said guide means and being movable between an initial position and an advanced position, said ejection means including means for biasing said ejection means towards said advanced position; said ejection means moving said receiver from said first position to said second position as said ejection means moves from said initial position to said advanced position, and, conversely, moving said receiver from said second position to said first position as said ejection means moves from said advanced position to said initial position;

first latch means for latching said ejection means when said ejection means is in said initial position;

pop-up means for initiating ejection means movement between said initial and advance positions, said pop-up means being movable between first and second locations, said pop-up means including means for biasing said pop-up means towards said first location; said pop-up means moving from said first location to said second location in conjunction with insertion of the floppy disc into said receiver, so that when said pop-up means is moved from said first location to said second location, said ejection means is disengaged from said first latch means and moves from said initial position to said advanced position;

second latch means for latching said pop-up means in said second location, so as to prevent an unintended release of said pop-up means from said second location to said first location and inadvertently releasing said floppy disc from said driving means before said ejection means is moved to said initial position, so as to eject said floppy disc from the receiver.

* * * * *